3,323,929
LOW VISCOSITY CASEIN
Harold K. Salzberg and Milton R. Simonds, Bainbridge, N.Y., assignors to The Borden Company, New York, N.Y., a corporation of New Jersey
No Drawing. Original application July 20, 1962, Ser. No. 211,435, now Patent No. 3,186,918, dated June 1, 1965. Divided and this application Apr. 8, 1965, Ser. No. 446,710
6 Claims. (Cl. 106—148)

This invention relates to low viscosity casein that retains the desirable properties of natural casein including strength of an adhesive bond thereof as measured, for example, by the paper coating pick test corresponding to wax numbers usually in the range 10—13.

This is a division of application Ser. No. 211,435 filed July 20, 1962, now Patent No. 3,186,918.

The importance of lowering the viscosity of casein for use as an adhesive, so as to make possible solutions of increased concentration and yet of viscosity suitable for mechanical roller, blade or like application has long been recognized. It can be calculated that the amount of water necessary to be absorbed or evaporated for each 100 pounds of casein applied from a 15% solution thereof is nearly twice the water associated with the same amount of casein in a 25% solution. This means that the drying time, an important factor in the high speed machinery operations of industry, could be reduced for a solution of casein of high concentration. It is important however, to avoid a corresponding loss of adhesive strength, other desirable properties, or yield normally realized with casein in the usual, acid-precipitated condition.

The present invention provides mild conditions of processing that do not disturb objectionably the properties of the finished casein for adhesive purposes and that lower the viscosity, in a short period of time such as 10-20 minutes to a level satisfactory in making casein solutions of high concentration and viscosity suitable for adhesive use.

The invention comprises the herein described process and the product resulting from introducing a protease into a dispersion of casein in micellar form, that is, that in which casein exists in milk, establishing an alkaline condition in the protease-casein dispersion, e.g., a pH of about 7.5–10, and then maintaining the resulting mixture at a temperature for the enzyme action until the viscosity of the casein subsequently separated is lowered to the level desired. In the preferred embodiment the milk is pasteurized and, in that event, cooled to a temperature below that of inactivation of the enzyme before the protease is introduced. In a modification, the invention includes substitution of the alkalizing step by the introduction of a calcium sequestrant into the milk so as to avoid interference of calcium ion with the properties of the product of the enzyme action. When we used milk without alkalization, treatment with the enzymes listed herein caused an increase in viscosity of the 15% solution of the resulting casein, unless the calcium in the milk has been sequestered.

When the casein that has been previously separated from the milk, as by acid precipitation, is redispersed in water, and maintained in contact with the same enzyme, at the same temperature and for the same period of time as stated above, the treatment described produces a product that lacks the adhesive strength necessary for best results in practice. The loss in strength of casein in the use of this process is referred to on page 19 of Program and Abstracts of the 12th Coating Conference of TAPPI held in Buffalo, N.Y., May 8–10, 1961.

The exact mechanism causing this surprising difference in results on the casein in its naturally dispersed form in milk and casein that has been separated and then redispersed in advance of the protease treatment we cannot explain with certainty. We attribute the difference to an effect of the enzyme on the micelles of casein in the milk, in the form sometimes called caseinogen, which is not produced when the enzymes have direct access to and can attack the molecular or smaller particles of casein redispersed in water.

In any event the difference is one that causes retention of adhesive bond strength, when the enzyme acts upon the casein in natural micellar condition, at a level that is higher and entirely different from that strength which results from like enzyme treatment of casein that has been first precipitated and then reconstituted to solution form.

The casein with which we start our processing is that occurring in milk, the casein being in natural condition, by which we mean not having been precipitated by acid or otherwise previous to the enzymatic action. The milk is suitably but not necessarily pasteurized before introduction of the selected protease, the pasteurizing giving a better control of the operation and more dependable results from the treatment.

The protease used is any of the proteolytic enzymes, these being known to attack the peptide linkage at the pH that we use. Examples of enzymes that we introduce are any of the commercially available protease, e.g., trypsin, papain, and subtilisin, the latter being a protease of bacterial origin. These enzymes may be used separately or two or more of them jointly, either in purified form, as commercial products supplying such enzymes, or in mixtures with other proteases. Examples of the commercial enzyme preparations that we use are "Pangestin," "Rhozyme PF," and "Amprozyme P," all being proteases available commercially.

The curding agent used to precipitate the casein after the enzyme modification of it is any acid that is commonly used in the precipitation of casein. Examples that we use are the acids lactic, hydrochloric and sulfuric. Other acids strong enough to reduce the pH of the milk to the range 4–5 can be used but are not selected because of their high cost.

When sequestration of the calcium in the milk is to be effected, we introduce any of the usual water-soluble calcium ion sequestering agents, examples being gluconic acid, sodium hexametaphosphate, sodium tripolyphosphate, and other polyphosphates of additional alkali metals, e.g., potassium or lithium.

We use the enzyme in amount to give a satisfactory rate of proteolysis as judged by decrease of viscosity, as for example 1–20 and ordinarily about 2–12 grams for 100 pounds of milk. On the basis of about 3% of casein in the milk, 2 grams of the enzyme correspond to approximately 0.15% of the weight of the casein and 20 grams to 1.5%.

The amount of acid used for the curding is that required to lower the pH to about 4–5 and for best yields approximately to the isoelectric point for the casein, namely 4.45–4.55.

As to conditions we treat casein in its natural micellar condition, that is dispersed in its natural state in milk. We alkalize the milk so as to establish a pH of 7.5–10 for the enzyme action, by the admixture of an alkali, e.g., sodium or potassium hydroxide predissolved in a small amount of water. We use, in the enzyme treatment, low temperatures favorable for preserving the combination of properties ordinarily associated with casein, with the exception of the viscosity, e.g., 90°–120° F. The enzyme modification is considerably slower at temperatures below 90°. We discontinue the enzyme treatment when test of a specimen shows lowering of the viscosity of the treated casein to that desired, e.g., by at least about a third, and before the casein becomes non-precipitable at its normal isoelectric point of pH about 4.5. The temperature at the time of curding is within about the same range, although temperatures of 105°–115° F. are recommended.

Examples 1–7

Casein adhesive was made as follows:

The skim milk fraction of freshly separted whole milk was used within 12 hours of such separation, with maintenance of the casein in micellar condition. Into this milk there were introduced amounts of the proteolytic enzyme shown in the table and either alkali or gluconic acid. In all of the examples except 7, alkali was used in the form of sodium hydroxide predissolved in a small amount of water and in proportion to raise the pH of the milk to within the range of about 7.5–8.5. When the gluconic acid replaced the alkali, as in Example 7, the effect of the acid appears to be favorable to the activity of the enzyme, at least when used in amount to correspond theoretically to that required to sequester all the calcium ion of the milk. However, the cost of chemicals is greater in the use of a calcium sequestrant, and we use, for economy, the alkalizing step.

After the mixture of the milk with the enzyme and the addition of either alkali or the sequestering agent, the whole was maintained at a temperature for enzyme action, actually 100°–120° F. in the several examples.

was introduced cold into the casein solution, in such amount as to give a suspension of total solids content 45% containing 15 parts of casein to 100 parts of clay.

The casein adhesive and also clay suspension adhesive prepared as described above were spread in separate tests and in usual amounts, in terms of total solids per unit of area of the paper to be coated, upon a face of the paper, the coating then dried thereon, and the adhesive strength or pigment bonding strength then tested by the wax pick or I.G.T. method.

The protease used in all the examples was mixed pancreatic enzymes sold under the name "Pangestin."

The table shows the proportion of the enzyme preparation "Pangestin," added; whether the skim milk used was raw (R), pasteurized (P), and alkalized (A), i.e., to a pH of approximately 8.5; the proportion of the enzyme in grams for 100 pounds of the milk; times and temperatures of the enzyme action upon the milk; and the tests for pH, viscosity and the strength, the latter as measured by the wax number in the pick test or with the I.G.T. machine.

The control specimens which appear on the first line of each example number were not mixed with any enzyme but were warmed to 100°–120° F.

The compositions tested and used and the results now follow:

Variations between individual lots of milk, taken on different days and at different seasons, disappear in the same lot used throughout any single example.

| Ex. No. | Kind of Milk | Enzyme, g./100 lbs. milk | Time | | 15% Casein Solution | | 45% Clay Coating Suspension | | |
|---|---|---|---|---|---|---|---|---|---|
| | | | Min. | Temp., °F. | pH visc. | Cps. | Viscosity, cps. | Wax No. | I.G.T., cm./sec. |
| 1 | R, A | | 10 | 100 | 9.0 | 1,940 | 11,750 | 11–12 | 140 |
| | R, A | 2 | 10 | 100 | 9.1 | 1,000 | 4,300 | 12–13 | 140 |
| | R, A | 2 | 20 | 100 | 9.0 | 1,060 | 6,500 | 11–12 | 140 |
| 2 | P, A | | 10 | 110 | 9.0 | 4,900 | 12,250 | 11–12 | 140 |
| | P, A | 2 | 10 | 110 | 8.9 | 720 | 2,900 | 11–12 | 140 |
| | P, A | 2 | 20 | 110 | 8.9 | 880 | 4,200 | 11–12 | 140 |
| 3 | R, A | | 10 | 110 | 9.1 | 2,420 | 10,250 | 11 | 240 |
| | R, A | 3 | 10 | 110 | 9.2 | 860 | 5,500 | 11 | 213 |
| 4 | R, A | | 10 | 110 | 8.9 | 2,120 | 14,000 | 11 | |
| | R, A | 2 | 10 | 110 | 8.9 | 1,160 | 10,250 | 11 | |
| | R, A | 3 | 10 | 110 | 8.9 | 1,080 | 8,500 | 11 | |
| 5 | R, A | | 10 | 120 | 8.9 | 1,160 | 5,000 | 9 | 306 |
| | R, A | 2 | 10 | 120 | 9.1 | 740 | 3,400 | 9 | 306 |
| | R, A | 2 | 20 | 120 | 9.2 | 800 | 2,360 | 9 | 302 |
| 6 | R, A | | 10 | 110 | 8.6 | 1,280 | 6,700 | 9 | |
| | R, A | 4 | 10 | 110 | 9.0 | 440 | 2,000 | 9 | |
| | R, A | 12 | 10 | 110 | 8.9 | 220 | 1,040 | 9 | |
| | Gluconic acid 184 g. added for 100 lbs. milk | | | | | | | | |
| 7 | R | 4 | | | 9.3 | 1,500 | 9,700 | 9 | |
| | | | | | 9.4 | 1,040 | 2,880 | 9 | |
| | R | 12 | | | 9.1 | 172 | 1,000 | 9 | |

After the times stated in the examples, that is 10–20 minutes, the enzyme-treated milk was then acidified with lactic acid in amount to bring the pH to the actual isoelectric point of approximately 4.5.

The casein so coagulated was then separated from the whey as by pressure or centrifugal filtration, washed with a small amount of water acidulated with the same acid approximately to pH 4.5, then tray-dried, and finally milled to the form of a powder.

In making the finished adhesive, the strength of coating which is to be tested, the casein so prepared was wetted out by being contacted for a few minutes with the water which is to appear in the casein solution, e.g., one of casein concentration 15%. Then there was added an alkali such as ammonium hydroxide solution, dry sodium carbonate, borax or the like to raise the pH of the wetted out casein suspension to pH 9. The resulting composition was then heated to 160° F. for about 15 minutes in order to complete the solution of the casein.

To make the clay suspension adhesive, the casein solution made as first described is mixed with a clay slip containing 70 parts of clay and 30 of water. The slip It will be observed that the casein solutions from the alkalized milk treated with enzyme showed decreases in viscosity in the 15% solution, of over a third, actually 36% and 89% of the two extremes. While the results vary from lot to lot of the milk, the strength tests show little or no deterioration on lowering the viscosity as compared to the control test on the same lot of milk. By "viscosity" of the casein, there is meant herein the viscosity in cps. of a solution of the precipitated, water washed, dried, powdered, and redispersed casein in a 15% aqueous solution.

Occasional results that appear to be out of line are to be expected in work of this kind. They do not destroy the conclusions based on a preponderance of evidence. Certain tests in Examples 3 and 6 show strengths somewhat lower than in other examples because of higher percentages of enzyme used.

When the treatment with Pangestin was applied to natural, non-alkalized milk, there was no decrease in the viscosity of the resulting casein, as measured in the 15% solution, except when the calcium sequestering agent had been added to the milk (Example 7). If a protease were used that is active at a pH on the acid side of 7; then the pH is adjusted to the level of optimal pH but outside the range at which casein is precipitated, i.e., away from isoelectric point.

Example 8

The procedure of Example 1 is followed except that trypsin is substituted for the Pangestin in that example. More specifically, trypsin is mixed with raw skim milk alkalized with sodium hydroxide to a pH of 8.5, in the proportion of 2 g. trypsin to 100 lbs. of milk. The whole is kept at 110° F. for 10 minutes, then curded with lactic acid at a pH of about 4.5, and the precipitated casein washed with acidified water and dried and powdered.

The composition and procedure of this Example 8 are followed exactly, in modifications thereof, except that the trypsin is replaced separately and in turn by each of the following proteases, each used in the amount of 2 grams: (a) papain, (b) a mixture in equal proportions of trypsin and papain, (c) Rhozyme PF, (d) Amprozyme P, and (e) subtilisin, the compositions processed, the casein then separated and made into casein adhesive giving coating compositions of abnormally low viscosity for a given concentration casein in the proportions and in the manner for the casein produced in Example 1 with and without the clay slip admixture.

Example 9

A coating was prepared of 60 percent total solids content, comprising papermakers' coating clay, titanium dioxide as pigment, a pigment dispersant, an alkali, and a solution of casein of Example 2 which had been isolated from milk pretreated with Pangestin protease at 110° F. for 10 minutes. The casein ingredient is functional and abnormally effective in promoting adhesion of coating to paper as described by McLaughlin and Schucker in TAPPI Magazine, vol. 40, page 146 (1957). The full coating formula in parts by weight was:

This blend of A, B, and C was spread on paper and separately on paperboard. It showed good adhesive strength and improved printability because of the acrylic copolymer supplied by the emulsion C.

Example 11

The procedure and composition of Example 9 were used except that the pigment dispersion B was omitted. The remaining solution of the low viscosity casein was useful as a casein adhesive.

In a modification of this example, the formula was as follows:

|  | Parts |
|---|---|
| Casein of kind described | 3.5 |
| 28% ammonium hydroxide | 0.3 |
| Water | 10.0 |
| Total weight | 13.8 |
| Casein content _____percent__ | 25 |

This product was a casein adhesive of increased rate of drying on paper or the like, because of the low proportion of water to be evaporated or absorbed.

Example 12

Another coating for paper or paperboard, typical of the commercial coating of label and poster stock, employed casein made by the process of this invention as a part of the pigment binder. In this case the binder composition consisted of 10 parts of low viscosity casein made by Example 2 using 2 grams of Pangestin for 100 lbs. of milk at 110° F. for 10 minutes, and 5 parts solids basis, of a latex of the copolymer (D) of 60 parts of styrene and 40 parts of butadiene, for 100 parts of paper coating clay. The full coating composition was prepared

| A. Casein Solution | | B. Pigment Dispersion | | C. Full Coating | |
|---|---|---|---|---|---|
| Casein of Ex. 2 | 3.5 | Coating clay | 280 | Solution A | 23.3 |
| Ammonium hydroxide, 28% NH₃ | 0.3 | Titanium dioxide | 70 | Dispersion B | 500.0 |
| Water | 19.5 | 10% Sodium hexametaphosphate sol | 10 | Latex of copolymer of 60 parts styrene and 40 of butadiene (29% solids) | 129.0 |
|  |  | 10% Sodium hydroxide sol | 7 |  |  |
|  |  | Water | 133 |  |  |
| Total weight | 23.3 |  | 500 |  | 652.3 |
| Solids, approx. percent | 15 |  | 70 |  | 60 |
| pH | 8.9 |  |  |  | 8.0 |
| Viscosity, cps | 720 |  |  |  | 1,000 |

The hexametaphosphate is a representative conventional pigment dispersing agent.

Coatings on bleached kraft paper were made of the mixed casein solution (A) and the pigment dispersion (B) on the face of bleached kraft paper at the rate of about 15 pounds per ream of the paper. The coating was dried and then tested for adhesive bond (or strength) by the wax pick and I.G.T. methods.

The results are satisfactory and confirmatory of the tests shown in the table.

Example 10

Here a copolymer of 15 parts of methyl methacrylate and 85 of ethyl acrylate, in an aqueous emulsion (C) of approximately 48% solids content, was mixed with A and B of Example 9 in the following proportions:

| Component: | Parts by weight, wet |
|---|---|
| Casein solution A | 23.3 |
| Pigment dispersion B | 500 |
| Copolymer emulsion C | 129 |
| Total weight | 652.3 |
| Solids content _____percent__ | 60 |
| Viscosity _____cps__ | 1000 |
| pH | 8.0 | in one sigma blade mixer by adding the ingredients one by one in the following order:

| Component: | Parts by weight |
|---|---|
| Coating clay | 1800 |
| Sodium hexametaphosphate, 10% solution | 54 |
| Water | 770 |
| Lower viscosity casein, dry | 180 |
| Sodium hydroxide, 10% solution | 36 |
| Ammonium hydroxide, 28% | 27 |
| Latex D | 187 |
| Water | 403 |
|  | 3457 |
| Total solid _____percent__ | 60 |
| pH | 8.6 |
| Viscosity _____cps__ | 3500 |

The coating of viscosity 3500 cps. had sufficient fluidity to permit spreading on paper. It gave a smooth, white, adherent coating of food adhesive bond.

It will be understood that it is intended to cover all changes and modifications of the examples of the invention herein chosen for the purpose of illustration which do not constitute departures from the spirit and scope of the invention.

What is claimed is:
1. A coating composition comprising an aqueous solution of casein of low viscosity resulting from the process of
   (a) mixing a protease that is active in alkaline medium into milk containing caseing in natural micellar condition,
   (b) admixing a water soluble alkali in amount to make the milk protease composition alkaline,
   (c) maintaining the resulting mixture at a temperature approximately within the range 90°–120° F. until the viscosity of the casein is lowered by at least about a third,
   (d) discontinuing the treatment before the casein becomes nonprecipitatable at the isoelectric point for casein,
   (e) then admixing a curding acid in amount to establish the pH at approximately the said isoelectric point, and
   (f) separating the casein from the whey that remains; and admixed finely divided pigmentary material.
2. The coating composition of claim 1 in which the pigmentary material is clay.
3. A coated product comprising a paper material in sheet form and the coating composition of claim 1 applied as a film over a face thereof.
4. A coated product comprising a paper material in sheet form and the coating composition of claim 2 applied as a film over a face thereof, the film being in dried condition.
5. The paper coating composition of claim 2 including an admixed emulsion of the copolymer of ethyl acrylate and methyl methacrylate.
6. The paper coating composition of claim 2 including an admixed emulsion of the copolymer of styrene and butadiene.

References Cited

UNITED STATES PATENTS

| | | | |
|---|---|---|---|
| 2,582,353 | 1/1952 | Patridge | 106—138 |
| 3,186,918 | 6/1965 | Salzberg et al. | 195—29 |

ALEXANDER H. BRODMERKEL, *Primary Examiner.*

T. MORRIS, *Assistant Examiner.*